United States Patent [19]
Tokarz et al.

[11] Patent Number: 5,685,596
[45] Date of Patent: Nov. 11, 1997

[54] WINDOW LIFT MECHANISM FOR AN AUTOMOTIVE VEHICLE

[75] Inventors: Stephen P. Tokarz, Flat Rock; Kim E. Taylor, Farmington Hills; Christopher J. Dilluvio, Warren; David Alan Smith, Macomb Township; Jeffrey Charping, Trenton, all of Mich.

[73] Assignee: ASC Incorporated, Southgate, Mich.

[21] Appl. No.: 381,506

[22] Filed: Jan. 31, 1995

[51] Int. Cl.$^6$ ............................................. B60J 7/12
[52] U.S. Cl. ............................................. 296/107; 296/201
[58] Field of Search ........................... 296/107, 146.14, 296/146.15, 146.16, 201

[56] References Cited

U.S. PATENT DOCUMENTS

| | | |
|---|---|---|
| 2,267,471 | 12/1941 | Keller . |
| 2,770,489 | 11/1956 | Garvey et al. . |
| 2,841,441 | 7/1958 | Evans . |
| 3,536,354 | 10/1970 | Ingram . |
| 4,778,215 | 10/1988 | Ramaciotti . |
| 4,784,428 | 11/1988 | Moy et al. . |
| 4,828,317 | 5/1989 | Muscat . |
| 5,118,158 | 6/1992 | Truskolaski . |
| 5,209,544 | 5/1993 | Benedetto et al. ............ 296/146.14 X |
| 5,456,516 | 10/1995 | Alexander et al. ............ 296/146.14 |
| 5,542,735 | 8/1996 | Furst et al. . |

FOREIGN PATENT DOCUMENTS

| | | |
|---|---|---|
| 0246201 | 11/1987 | European Pat. Off. . |
| 1382296 | 11/1964 | France . |
| 727661 | 4/1955 | United Kingdom . |

OTHER PUBLICATIONS

"1973 Car Shop Manual—vol. 4 Body", by Ford Marketing Corp., Sep. 1972 pp. 42-03-01, 42-03-04, 42-06-01 thru 42-06-05, 42-07-01 thru 42-07-05, 42-08-01 thru 42-08-03, 42-08-06, 42-08-07, 42-21-01 thru 42-21-03, 42-22-01 thru 42-22-04, 42-24-01 thru 42-24-05, 42-25-01, 42-25-02, 42-31-01 thru 42-31-04, 42-32-01 thru 42-32-03, 42-33-01 thru 42-33-03, 42-34-01 thru 42-34-03, 42-35-01 thru 42-35-03, 42-41-01 thru 42-41-05, 42-46-01, 42-46-02.

Primary Examiner—Joseph D. Pape
Attorney, Agent, or Firm—Harness, Dickey & Pierce, P.L.C.

[57] ABSTRACT

A window lift mechanism for an automotive vehicle employs a side window which can pivot in a vertical manner from a raised position to a lowered position while simultaneously moving in a crosscar manner. Preferably the window is a quarter window operable with a convertible roof.

27 Claims, 6 Drawing Sheets

U.S. Patent  Nov. 11, 1997  Sheet 1 of 6  5,685,596
FIG 1
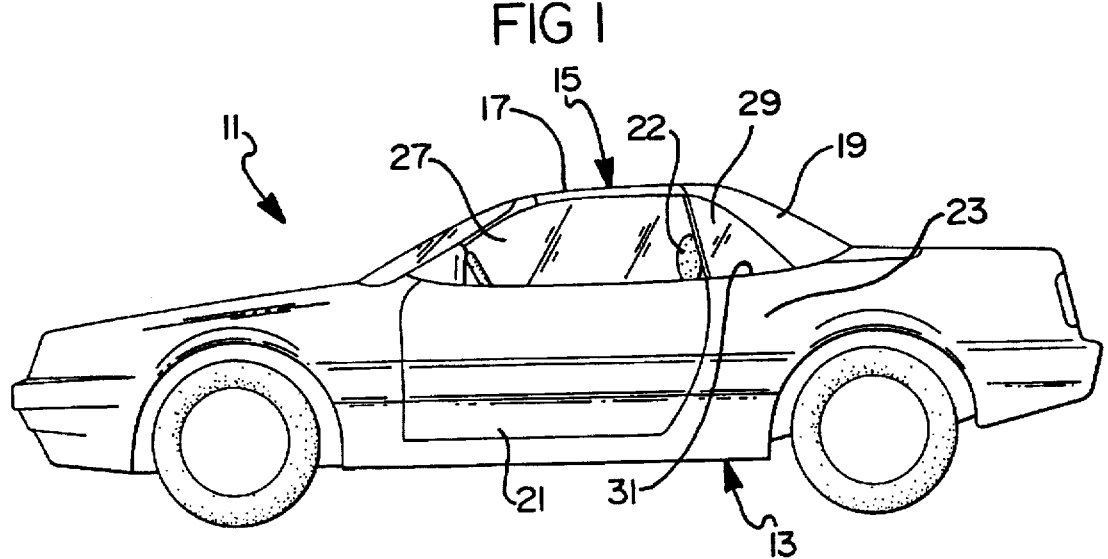
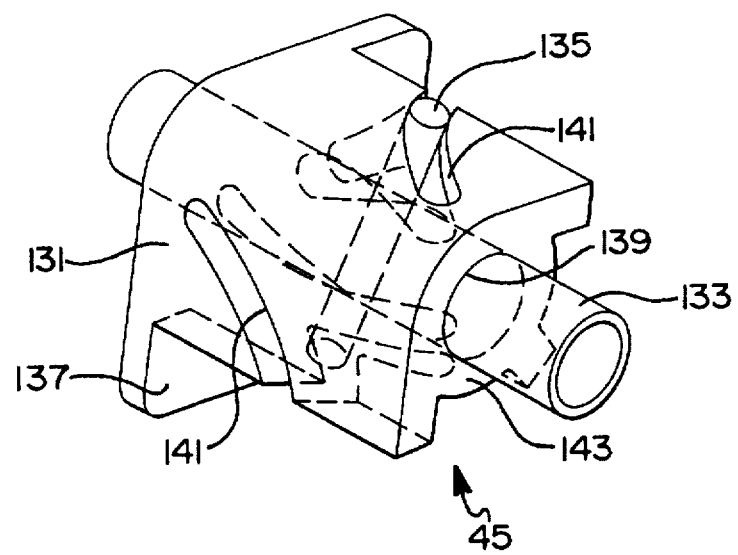
FIG 3

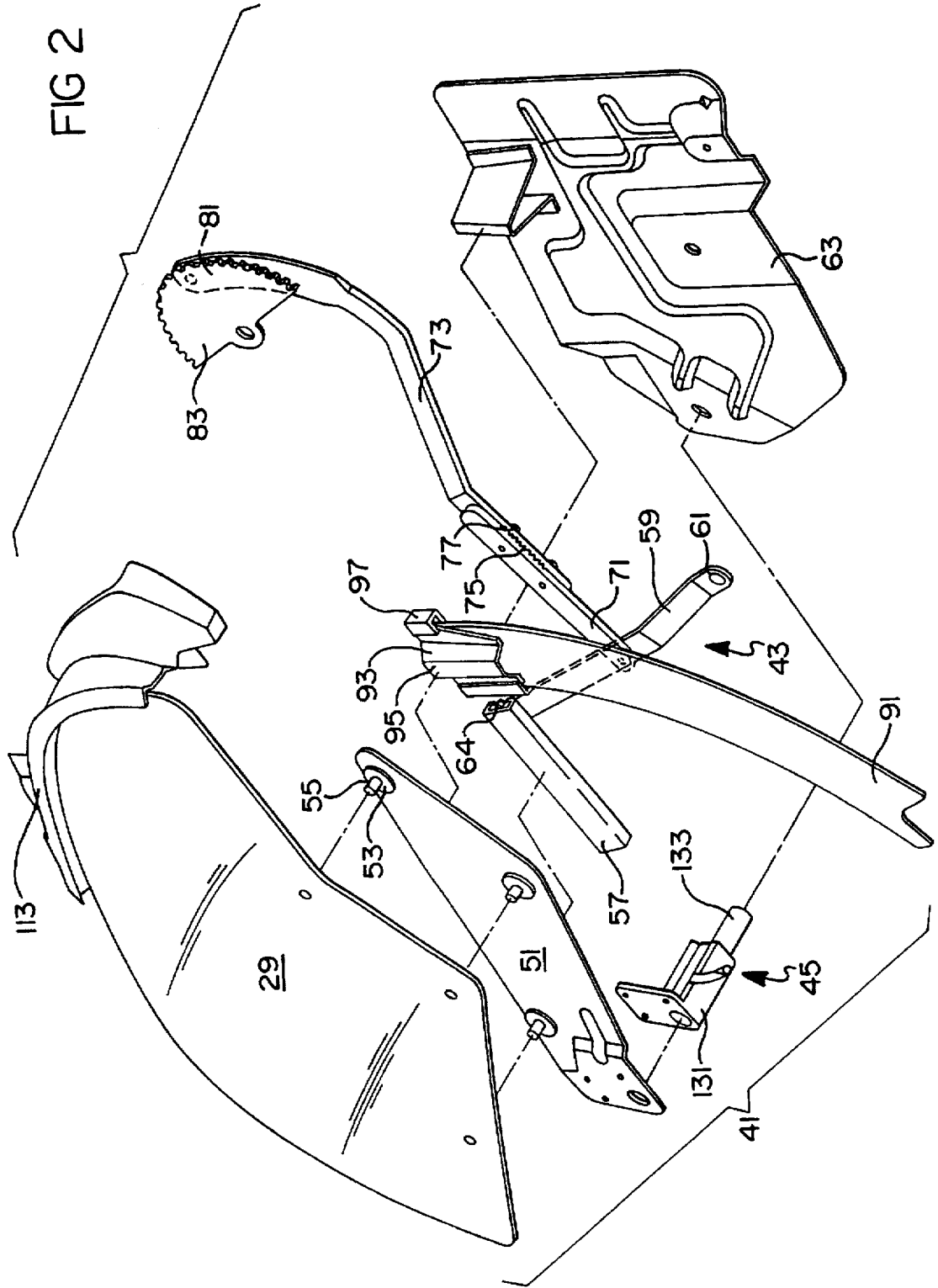

WINDOW LIFT MECHANISM FOR AN AUTOMOTIVE VEHICLE

BACKGROUND AND SUMMARY OF THE INVENTION

This invention relates generally to side windows for automotive vehicles and specifically to a window lift mechanism which provides movement to a side window.

It is well known within the automotive industry to provide window lift mechanisms for raising and lowering door and quarter panel windows. However, the recent trend toward increasing the crosscar curvature or rake of the side windows has proven problematic in the design of window lift mechanisms and the automotive vehicle body structure. The extreme window curvature has forced many vehicles to have a large crosscar window opening within a beltline of the door or quarter panels and has caused the door and quarter panels to have an undesirably large crosscar window receiving cavity. These increased crosscar dimensions have been required in order to accept the window through its travel as it is retracted. These increased crosscar dimensions have further proven to be unsightly and to use space otherwise dedicated to the interior passenger compartment.

Automotive vehicles having convertible roofs provide further design challenges for quarter window lift mechanisms. For example, in many constructions, the quarter window must be retracted prior to retraction or folding of the convertible top. The predominant method to insure such prior retraction of the quarter window is achieved through coupling the quarter window with the convertible roof linkages. Such constructions are shown within the following U.S. Pat. Nos: 5,118,158 entitled "Convertible Top Linkage Assembly with Laterally Moving Rear Quarter Windows" which issued to Truskolaski on Jun. 2, 1992, and is assigned to the assignee of the present invention; 4,828,317 entitled "Convertible Top Frame with Quarter Windows" which issued to Muscat on May 9, 1989; 4,784,428 entitled "Apparatus and Method of a Convertible Top with Hard Glass with Bottom Sealing" which issued to Moy et al. on Nov. 15, 1988; 4,778,215 entitled "Flexible Roof for Motor Vehicles" which issued to Ramaciotti on Oct. 18, 1988; 3,536,354 entitled "Vehicle Bodies" which issued to Ingram on Oct. 27, 1970; and, 2,267,471 entitled "Collapsible Top for Motor Vehicles" which issued to Keller on Dec. 23, 1941. The disclosures of all these patents are incorporated by reference herewithin. These traditional constructions require the quarter window to raise and lower in combination with retraction or extension of the convertible top. Furthermore, the majority of these constructions employ frames, linkages or pillars around all edges of the quarter window. The window frames detrimentally increase the crosscar beltline opening and quarter panel receiving cavity dimensions. They also increase the weight of the glass and make the window more visually prominent.

In accordance with the present invention, the preferred embodiment of a window lift mechanism for an automotive vehicle employs a side window which can pivot in a vertical manner from a raised position to a lowered position while simultaneously moving in a crosscar manner. In one aspect of the present invention, the vertical and crosscar movements are combined within a single pivoting mechanism. In another aspect of the present invention, a pivot mechanism is disposed adjacent to a forward and lower portion of a side window. In yet another aspect of the present invention, the side window can be lowered regardless of the position of an automotive vehicle roof.

The window lift mechanism of the present invention provides many advantages over the prior art. For example, a quarter window of the present invention can be raised and lowered independently from a convertible soft top or hard top roof used therewith. Furthermore, a highly curved window, employing the teachings of the present invention, may be retracted into the adjacent body panels with a minimum crosscar dimension for the beltline window opening and window receiving cavity. The window lift mechanism of the present invention also does not require aesthetically unappealing frames or visible linkages surrounding the visible edges of the side window. The present invention is also advantageous in that it provides crosscar movement to the side window simultaneously throughout the full vertical window movement. Moreover, improved weatherstrip sealing is achieved without the need for separate and relatively expensive supplemental spring loaded or wheeled devices. Additional advantages and features of the present invention will become apparent from the following description and appended claims, taken in conjunction with the accompanying drawings.

BRIEF DESCRIPTION OF THE DRAWINGS

FIG. 1 is a side elevational view showing an automotive vehicle employing a preferred embodiment of the present invention window lift mechanism in combination with a convertible roof;

FIG. 2 is an exploded perspective view showing the preferred embodiment of the present invention window lift mechanism;

FIG. 3 is a perspective view showing a pivot mechanism employed in the preferred embodiment of the present invention window lift mechanism of FIG. 2;

DETAILED DESCRIPTION OF THE PREFERRED EMBODIMENT

Figure 4:
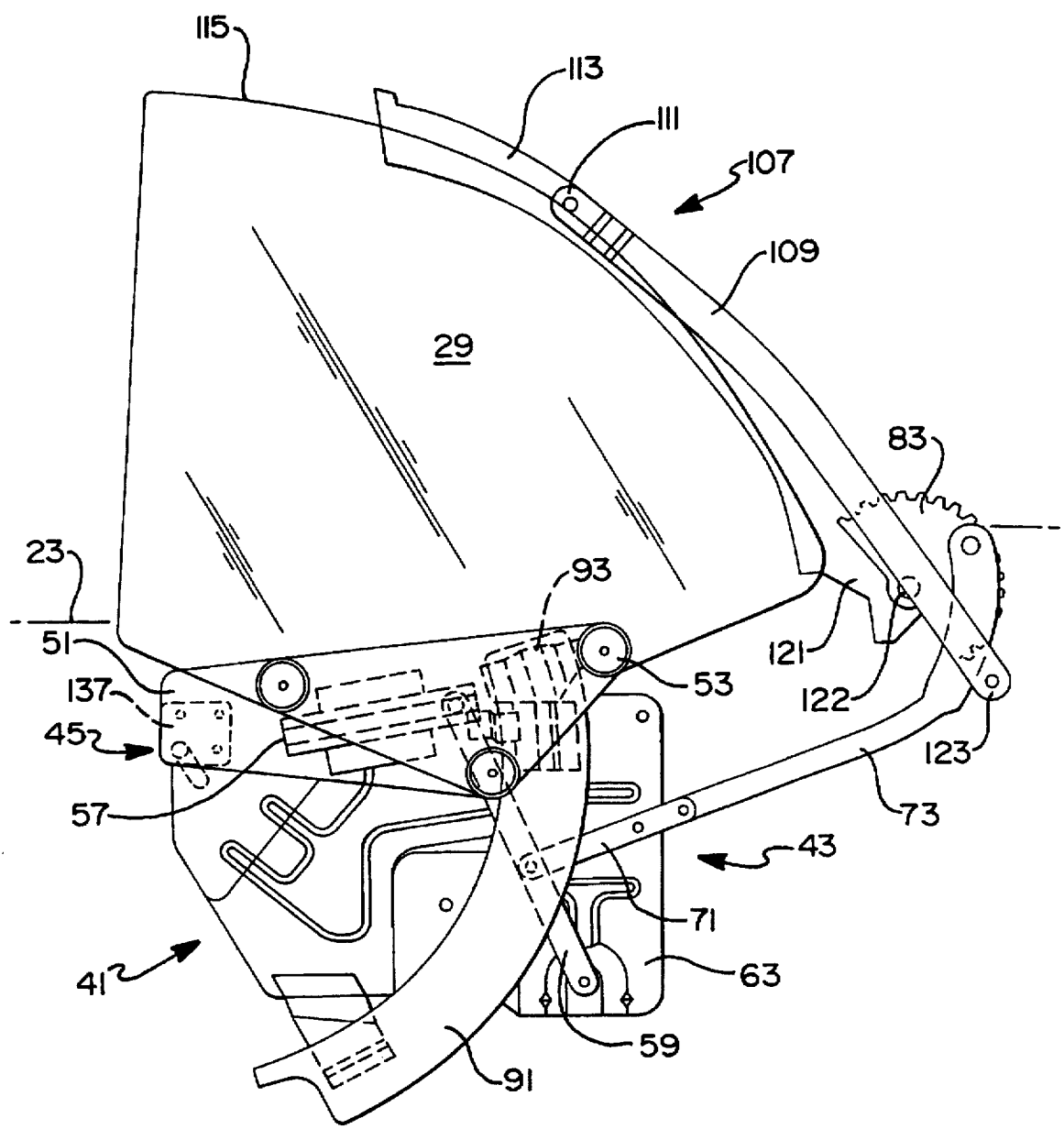
FIG. 4 is a side elevational view of the preferred embodiment of the present invention window lift mechanism of FIG. 2, shown in a raised position.

In accordance with the present invention, a window lift mechanism is employed to raise and lower one or more side windows within an automotive vehicle. Referring to FIG. 1, an automotive vehicle 11 has a body 13 and a convertible roof 15. Roof 15 can be a conventional soft top folding roof, wherein a plurality of roof bows and rails support a fabric top, or a foldable hard top roof wherein one or more rigid panels 17 and 19 can be inwardly collapsed in a clamshell manner and horizontally stowed behind a front seat 22. The automotive vehicle body 13 includes a hingeable front door 21, an outer quarter panel 23 and an inner quarter panel 25 (see FIG. 5). A door side window 27 can be raised and lowered into a beltline area 31 of door 21 and a quarter side window 29 can be raised and lowered into beltline area 31 of quarter panels 23 and 25.

As can be observed in FIGS. 2 and 4, a preferred embodiment of a window lift mechanism 41 includes a glass quarter window 29, a window linkage system 43 and a pivot mechanism 45. Linkage system 43 is constructed as follows. A stamped steel mounting bracket 51 is affixed to a lower portion (when raised) of quarter window 29 through a plurality of spacers 53 and retainer studs 55 which can be adhered, bolted and/or clipped onto quarter window 29. A quarter window drive channel 57 is welded to mounting bracket 51. Drive channel 57 has an elongated body with a C-shaped cross section and is preferably manufactured from rolled steel but can also be extruded from aluminum. A drive link 59 has a proximal end 61 pivotably coupled to a mounting plate 63 also referenced herein as a body panel. Drive link 59 further has a distal end 64 slidably coupled to drive channel 57 by a roller or the like for longitudinal movement therealong.

A front primary link 71 is pivotably coupled to drive link 59. A rear primary link 73 is adjustably attached to front primary link 71 through a serrated interface 75 and a plurality of bolts 77. During installation, primary links 71 and 73 can be longitudinally adjusted in relation to one another by varying the engagement of the serrations at serrated interface 75 as well as by moving bolts 77 within longitudinally oriented slots (not shown) in rear primary link 73 prior to tightening bolts 77. A proximal end 81 of rear primary link 73 is pivotally coupled to a sector gear 83. Sector gear 83 is pivotably mounted to mounting plate 63 and is driven in a conventional manner by a fractional horsepower dc electric motor and pinion gear (not shown).

Figure 6:
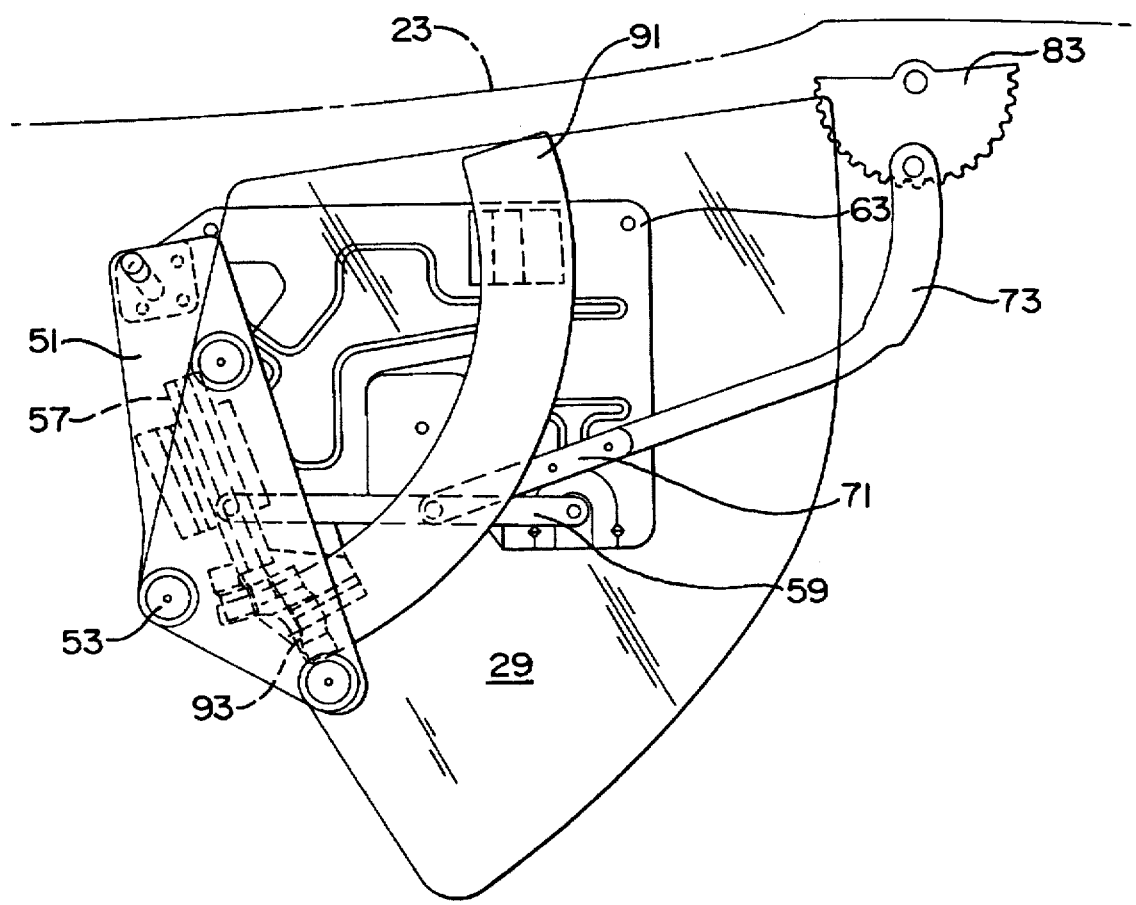
FIG. 6 is a side elevational view of the preferred embodiment of the present invention window lift mechanism of FIG. 2, shown in a lowered position.

Thus, a comparison of FIGS. 4 and 6 show the linkage system 43 movement employed to raise and lower quarter window 29. Sector gear 83 moves primary links 73 and 71 which, in turn, moves drive link 59 thereby raising and lowering window drive channel 57 and quarter window 29 about pivot mechanism 45.

Returning again to FIG. 2, a guide track 91, which has an arcuate scimitar-like shape, is stationarily affixed to mounting plate 63. An upper guide 93 has a body 95 welded to mounting bracket 51 for movement therewith. Upper guide 93 further has a pair of plastic clips 97 mounted on either extremity of body 95 for interfacing along edge portions of guide track 91. Guide track 91 is preferably made from stamped steel but may also be die cast. Upper guide 93 preferably has a stamped steel body 95 with Delrin® acetal polymeric clips 97. Although not preferred, mounting plate 63 may further have an elongated stamped stabilizer finger extending therefrom with a felt pad adhered at an end thereof for maintaining and stabilizing the lowered quarter window during vehicular movement.

Referring to FIGS. 4 and 6, a convertible roof or top stack linkage system 107 is used in combination with window lift mechanism 41. The top stack linkage system 107 shown is for a soft top convertible roof. In this embodiment, a balance link 109 has a distal end 111 pivotably coupled to an aluminum die cast rear rail 113. Rear rail 113 may alternately be constructed from stamped steel or from cast magnesium. Rear rail 113 supports the convertible roof while also providing a frame which is independently movable from around an otherwise visible, exposed and unsupported upper rear edge 115 of quarter window 29. A V-shaped latex foam seal (not shown) having a Teflon® (polytetrafluoroethylene) coating is preferably affixed within rear rail 113 along the crotch of the V section for sealing and capturing both sides of quarter window 29 when raised. Alternatively, an EPDM (ethylene-propylene terpolymer) synthetic rubber bulb type seal may prove most desirable for durability. In the present embodiment, a proximal end 121 of rear rail 113 is pivotably coupled to mounting plate 63 coincidental with a pivot axis 122 of sector gear 83. Balance link 109 has a distal end 123 coupled to the vehicle body. Balance link 109 is also pivotably coupled for movement to sector gear 83. This embodiment is relatively easy and low cost to achieve since both the convertible roof and window lift mechanism are driven synchronously in a mechanical manner through sector gear 83 and a single attached motor. Of course it will also be appreciated that symmetrically opposite image window lift mechanisms, top stack linkage systems and electronically synchronized motors will be employed on both sides of the automotive vehicle.

In another embodiment, balance link 109 and rear rail 113 are driven in a conventional manner by a separate and independent sector gear (not shown) and motor (not shown) from those used to drive the present invention window lift mechanism 41. This alternate embodiment allows quarter window 29 to be raised or lowered independently from rear rail 113 and the retractable roof regardless of the roof's position. In some instances, it may desirable to employ an electrical control circuit with limit switches or potentiometers controlling the electric motors through a microprocessor in order to lower quarter windows 29 prior to or during retraction of the convertible roof. However, where this control system is needed, quarter windows 29 could also be selectively raised and lowered both when the convertible roof remains in its extended position covering the vehicle passenger compartment and when the convertible roof is in its fully stowed position. While this embodiment may cost more to produce, it provides significantly improved operational advantages for rear seat passengers.

FIG. 3 illustrates the preferred pivot mechanism 45 of the present invention. Pivot mechanism 45 comprises a cam collar 131, a window pivot stem 133 and a hardened steel interface pin 135. Cam collar 131 contains a flange 137 affixed to mounting bracket 51 through screws, rivets or the like. Cam collar 131 is further defined by a substantially cylindrical bore 139 axially running therethrough with a pair of cam slots 141 transversely disposed through a wall section 143. Window pivot stem is preferably a hardened steel tube, but may also be a solid rod which extends partially within bore 139 of cam collar 131. Interface pin 135 is transversely affixed to window pivot stem 133 so as to ride upon cam slot 141. Cam collar 131 is preferably made from a Delrin® acetal polymer but may also be cast or formed from a metallic or composite material. A Teflon® grease is used between window pivot stem 133 and cam collar 131. Other interface means, such as ball bearings, screws extending inward from the cam collar, integral ribs extending outward from the window pivot stem, or the like, may also be employed to interface in a camming manner between window pivot stem 133 and cam collar 131. It will also be appreciated that cam collar may be reversibly attached to mounting plate 63 while window pivot stem 133 is coupled to mounting bracket 51.

Figure 5:
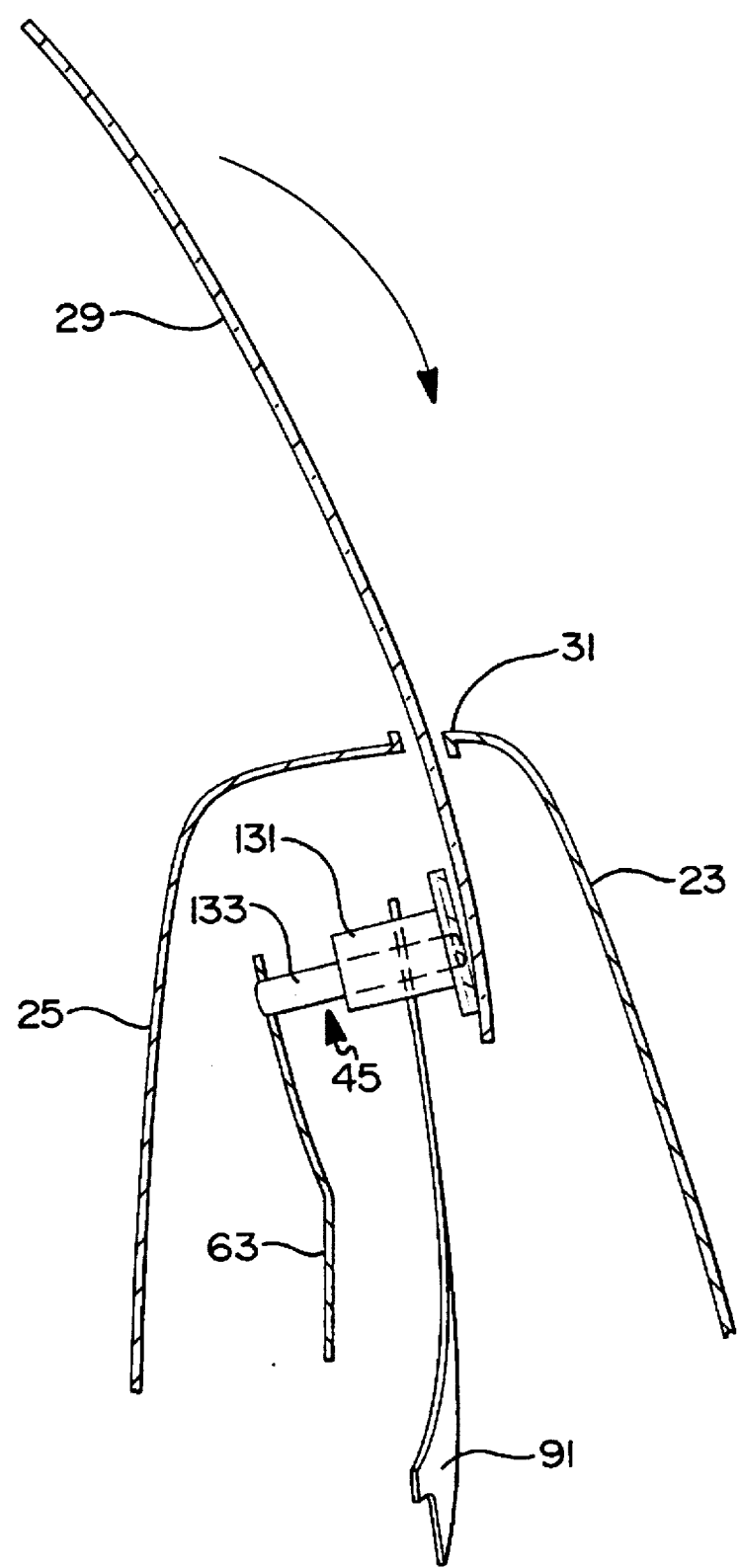
FIG. 5 is a front elevational view, taken partially in section, showing the preferred embodiment of the present invention window lift mechanism of FIG. 4.
Figure 7:
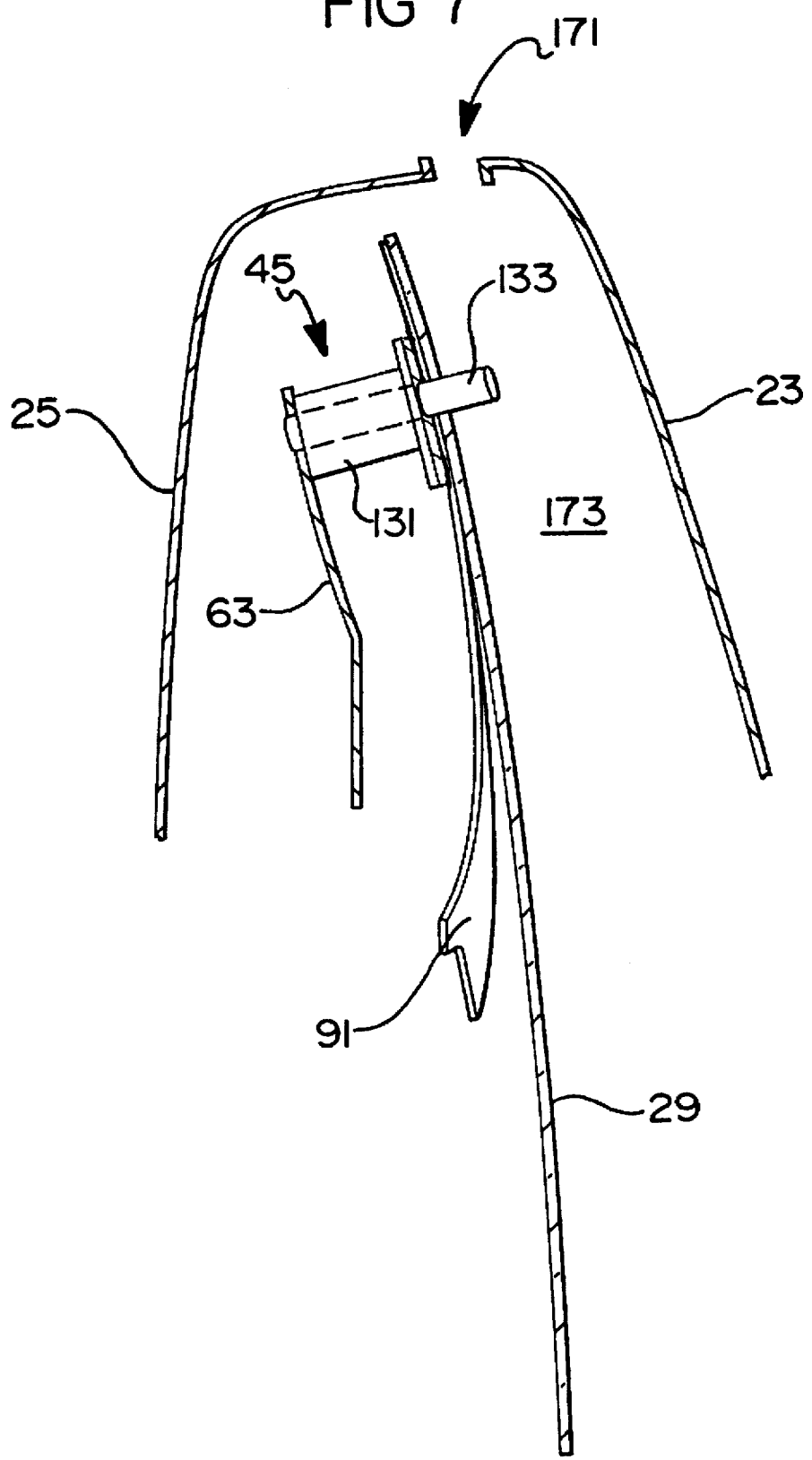
FIG. 7 is a front elevational view, taken partially in section, showing the preferred embodiment of the present invention window lift mechanism of FIG. 6.

Pivot mechanism 45 is coupled adjacent to a forward lower portion of quarter window 29 (when raised) such that upon operation, quarter window 29 vertically pivots from a raised position, illustrated in FIGS. 4 and 5, to a lowered position, illustrated in FIGS. 6 and 7. It is also significant that the quarter window 29 is highly curved in a crosscar manner. Since interface pin 135 and window pivot stem 133 axially move in a crosscar manner in response to cam slots 141 of cam collar 131, quarter window 29 will smoothly and simultaneously move in a crosscar manner during vertical raising and lowering. This serves to minimize the crosscar beltline window opening 171 and crosscar dimensions of window receiving cavity 173. It is further important to note that guide track 91 must be precisely aligned to cooperate with cam slots 141 (see FIG. 3) so as to prevent undesirable binding during vertical movement of quarter window 29.

While the preferred embodiment of this window lift mechanism has been disclosed, it will be appreciated that various modifications may be made without departing from the present invention. For example, other linkage mechanisms may be provided to move the side window or convertible roof. Furthermore, a manually operated convertible roof and window lift mechanism may also be employed. The linkage and guide mechanisms may also be attached directly to a quarter panel rather than having an intermediate mounting plate fastened thereto. It is further envisioned that the side window may have framing or weather seals mounted along one or more edges thereof. A guide cable, channel or roller system may be used instead of the guide mechanisms discussed. Moreover, the cam slots may be defined by a multitude of differing shapes. Various materials have been disclosed in an exemplary fashion, however, other materials may of course be employed. It is intended by the following claims to cover these and any other departures from the disclosed embodiment which fall within the true spirit of this invention.

The invention claimed is:

1. A window lift mechanism for an automotive vehicle comprising:
   a side window; and
   a pivot mechanism journalling said side window relative to a body of said automotive vehicle, said pivot mechanism disposed adjacent to a forward and lower portion of said side window when in raised position;
   said side window being vertically pivotable about said pivot mechanism; and
   said pivot mechanism further causing a crosscar movement of said side window concurrent with said vertical pivoting movement.

2. The window lift mechanism of claim 1 further comprising:
   a guide track affixed to said body of said automotive vehicle, said guide track having a substantially three-dimensional arcuate shape; and
   a guide slidably movable along said guide track, said guide moving coincidental with said side window.

3. The window lift mechanism of claim 2 further comprising:
   a window drive channel having a substantially C-shaped cross section, said window drive channel movable coincidental with said side window; and
   a drive link having a proximal end pivotably coupled to said body of said automotive vehicle and having a distal end slidably coupled to said window drive channel for longitudinal movement therealong.

4. The window lift mechanism of claim 3 further comprising:
   a front primary link pivotably coupled to said drive link;
   a rear primary link adjustably attached to said front primary link; and
   a sector gear pivotably coupled to said body of said automotive vehicle, said sector gear moving said rear primary link which in turn moves said front primary link which further moves said distal end of said drive link which in turn selectively raises and lowers said window drive channel and said side window about said pivot mechanism.

5. The window lift mechanism of claim 3 further comprising:

a mounting bracket having a plurality of studs mounted thereon, said plurality of studs fastening said side window to said mounting bracket; and
   a cam collar, said window drive channel and said guide all being mounted upon said mounting bracket.

6. The window lift mechanism of claim 1 wherein said automotive vehicle has a retractable roof.

7. The window lift mechanism of claim 6 wherein said retractable roof is a foldable hard-top roof.

8. The window lift mechanism of claim 1 wherein said pivot mechanism includes:
   a cam collar having a substantially cylindrical bore axially running therethrough, said cam collar further having a cam slot transversely disposed therein;
   a window pivot stem journalled for rotation at least partially within said bore of said cam collar; and
   means for interfacing between said window pivot stem and said cam slot of said cam collar, said means for interfacing providing axial movement to said window pivot stem in relation to said cam collar upon pivotal rotation of said window pivot stem within said cam collar.

9. The window lift mechanism of claim 8 wherein:
   said cam collar moves with said side window; and
   said window pivot stem is affixed to said body of said automotive vehicle.

10. The window lift mechanism of claim 1 wherein said side window is defined as a quarter window, said quarter window further having a curved shape in the crosscar direction.

11. The window lift mechanism of claim 10 wherein said body of said automotive vehicle immediately below said quarter window includes inner and outer quarter panels, said quarter window being raisable and lowerable substantially above and below a beltline portion of said inner and outer quarter panels.

12. The window lift mechanism of claim 1 further comprising:
   a rear rail defining a disengagable frame around an edge of said side window, said rear rail being movable independently from said side window; and
   a balance link having a distal end pivotably coupled to said rear rail.

13. The window lift mechanism of claim 1 wherein said side window is a door window.

14. In combination, a window lift mechanism and a foldable roof for a convertible automotive vehicle, the combination comprising:
   a quarter window vertically pivotable about a pivot, said pivot being disposed adjacent to a bottom portion of said quarter window;
   said quarter window being further movable in a crosscar manner;
   said foldable roof being movable from a raised position to a lowered position; and
   at least one edge of said quarter window being unsupported and uncovered by a window frame and visible when said retractable roof is in said lowered position.

15. The combination of claim 14 wherein said pivot includes:
   a cam collar having a substantially cylindrical bore axially running therethrough, said cam collar further having a cam slot transversely disposed therein;
   a window pivot stem journalled for rotation at least partially within said bore of said cam collar; and means for interfacing between said window pivot stem and said cam slot of said cam collar, said means for interfacing providing axial movement to said window pivot stem in relation to said cam collar upon pivotal rotation of said window pivot stem within said cam collar.

16. The combination of claim 15 further including:
   a guide track affixed to said body of said automotive vehicle, said guide track having a substantially three-dimensional arcuate shape;
   a guide slidably movable along said guide track, said guide moving coincidental with said quarter window;
   a window drive channel having a substantially C-shaped cross section, said window drive channel being movable coincidental with said quarter window;
   a drive link having a proximal end pivotably coupled to said body of said automotive vehicle and having a distal end slidably coupled to said window drive channel for longitudinal movement therealong;
   a front primary link pivotably coupled to said drive link;
   a rear primary link adjustably attached to said front primary link;
   a sector gear pivotably coupled to said body of said automotive vehicle, said sector gear moving said rear primary link which in turn moves said front primary link which further moves said distal end of said drive link which in turn raises and lowers said window drive channel and said quarter window about said pivot;
   a rear rail defining said window frame around an upper rear edge of said quarter window, said rear rail being movable independently from said quarter window; and
   a balance link having a distal end pivotably coupled to said rear rail.

17. The combination of claim 14 wherein said foldable roof is a folding hard-top roof.

18. In combination, a window lift mechanism and a foldable roof for a convertible automotive vehicle, the combination comprising:
   a quarter window vertially pivotable about a pivot, said pivot disposed substantially adjacent to a forward and lower portion of said quarter window when in a raised position;
   a window drive channel coupled for movement with said quarter window;
   a drive link having a proximal end pivotably coupled to a body of said automotive vehicle and a distal end slidably coupled to said window drive channel;
   a primary link pivotably coupled to said drive link;
   a sector gear pivotably coupled to said body, said sector gear moving said primary link which in turn moves a distal end of said drive link which in turn raises and lowers said window drive channel and said quarter window about said pivot;
   said foldable roof being movable from a raised position to a lowered position;
   a roof rail movable independently from said quarter window, said roof rail being coupled to said foldable roof; and
   a balance link having a distal end pivotably coupled to said roof rail.

19. The window lift mechanism of claim 18 wherein said pivot includes:
   a cam collar having a substantially cylindrical bore axially running therethrough, said cam collar further having a cam slot transversely disposed therein;
   a window pivot stem journalled for rotation at least partially within said bore of said cam collar; and
   means for interfacing between said window pivot stem and said cam slot of said cam collar, said means for interfacing providing axial movement to said window pivot stem in relation to said cam collar upon pivotal rotation of said window pivot stem within said cam collar.

20. The window lift mechanism of claim 18 wherein said retractable roof is a foldable hard-top roof.

21. A method for lowering a side window into an automotive vehicle body comprising the steps of:
   (a) pivoting said side window in a vertical manner from a raised position to a lowered position and substantially hidden position;
   (b) moving said side window in a crosscar manner simultaneous with said pivoting in said vertical manner;
   (c) lowering said side window regardless of an automotive vehicle roof position;
   (d) folding a retractable roof from a raised position to a stowed position; and
   (e) exposing at least one edge of said side window upon said folding of said retractable roof.

22. The method of claim 21 further comprising the steps of:
   (a) moving a cam collar congruent with said side window;
   (b) affixing a window pivot stem to remain stationary;
   (c) pivoting said window pivot stem within said cam collar; and
   (d) moving said window pivot stem axially within said cam collar simultaneous with said pivoting therein.

23. The method of claim 21 further comprising the step of:
   (a) raising and lowering said side window mechanically independently from said folding of said retractable roof.

24. A method for lowering a side window into an automotive vehicle body comprising the steps of:
   (a) pivoting said side window in a vertical manner from a raised position to a lowered and substantially hidden position;
   (b) moving said side window in a crosscar manner simultaneous with said pivoting in said vertical manner; and
   (c) combining said pivoting in said vertical manner and said moving in said crosscar manner within a single pivoting mechanism that performs both functions.

25. The method of claim 24 further comprising the steps of:
   (a) providing a cam collar having a substantially cylindrical bore axially running therethrough, said cam collar further having a cam portion;
   (b) rotating a window pivot stem at least partially within said bore of said cam collar;
   (c) interfacing said window pivot stem with said cam portion of said cam collar; and (d) moving said window pivot stem axially in relation to said cam collar upon said rotating of said window pivot stem within said cam collar.

26. The method of claim 25 further comprising the steps of:
   (a) moving said cam collar with said side window; and
   (b) affixing said window pivot stem to said body of said automotive vehicle.

27. The method of claim 25 further comprising the steps of:
   (a) pivoting a sector gear in relation to said body;
   (b) moving a rear primary link by said sector gear;
   (c) moving a front primary link by said rear primary link;
   (d) moving a distal end of a drive link by said front primary link; and
   (e) raising and lowering a window drive channel and said side window about said pivot mechanism by said moving of said drive link.

* * * * *